United States Patent [19]

Koch

[11] Patent Number: 4,838,616
[45] Date of Patent: Jun. 13, 1989

[54] MULTIPART RIM

[75] Inventor: Adolf Koch, Waiblingen-Neustadt, Fed. Rep. of Germany

[73] Assignee: Sport-Service-Lorinser Sportliche Autoausrustung GmbH, Wiblingen, Fed. Rep. of Germany

[21] Appl. No.: 162,953

[22] Filed: Mar. 2, 1988

[30] Foreign Application Priority Data

Mar. 9, 1987 [DE] Fed. Rep. of Germany ....... 3707514
Jun. 11, 1987 [DE] Fed. Rep. of Germany ....... 3719453

[51] Int. Cl.⁴ .............................................. B60B 25/00
[52] U.S. Cl. ................. 301/10 R; 301/11 S; 301/63 D
[58] Field of Search ........... 301/37 R, 37 CM, 37 SC, 301/37 SS, 9 R, 10 R, 11 R, 11 CD, 11 S, 63 R, 63 D

[56] References Cited

U.S. PATENT DOCUMENTS

| | | | |
|---|---|---|---|
| 1,492,232 | 4/1924 | Williams | 301/63 D |
| 1,583,994 | 5/1926 | Randall | 301/11 CD |
| 2,187,032 | 1/1940 | Horn et al. | 301/64 SD |
| 3,582,141 | 6/1971 | Kelsey, Jr. | 301/65 X |
| 4,095,484 | 6/1978 | Gautraud | 301/5 B X |
| 4,181,365 | 1/1980 | Kawaguchi et al. | 301/67 |
| 4,219,241 | 8/1980 | Muller et al. | 301/6 CS |

Primary Examiner—Russell D. Stormer
Attorney, Agent, or Firm—Barnes & Thornburg

[57] ABSTRACT

A multipart, extremely low weight tire rim for high-speed vehicles wherein the interior part of the rim or wheel spider is made of titanium for strength purposes, while the exterior rim parts holding the tire and forming the tire bed consist of aluminum or another easily workable material and wherein the interior part of the rim or wheel spider may be constructed to be disk-shaped or of an arched shape that is manufactured by deformation of titanium sheet metal in the superplastic state.

22 Claims, 3 Drawing Sheets

MULTIPART RIM

BACKGROUND AND SUMMARY OF THE INVENTION

The invention relates to a multipart rim having an interior part of the rim or wheel spider for mounting at an axle, as well as having annular exterior parts that are located radially on the outside of the rim at both the inner and outer sides of the interior part of the rim or wheel spider to form a tire bed.

The use of multipart tire rims are commercially known. Multipart construction offers the advantage that different interior parts of the rim or wheel spiders may be combined with different exterior parts of the rim in order to develop or adapt the tire rim to different vehicles and different tire sizes or widths. These multipart tire rims can be sold as kits with various sized external parts.

Since the unsprung masses of vehicles, particularly high-speed vehicles, should be as low as possible, and since tire rims constitute a considerable part of the unsprung vehicle masses, it is basically desirable for the weight of the tire rims to be as low as possible. In this connection, multipart rims made of a light metal on the basis of aluminum and/or magnesium are known. However, even a further weight reduction is desirable. This goal cannot be achieved by means of conventional light metals.

Metallurgists know that components capable of withstanding extreme stress can be manufactured from titanium with an extremely low weight, as shown by the example of rotors for turbines of airplanes. Even though titanium alloys exist from which deformable sheets can be Produced by pressing and drawing, the processing of titanium materials is extremely costly, particularly when workpieces are to be produced that have complicated shapes. Thus, although it is basically possible to manufacture rims from titanium, it has not been possible to do so economically.

It is therefore an object of this invention to provide an economically produceable rim that distinguishes itself with respect to known, commercially available lightweight construction rims by a clear reduction in weight accompanied by the ability to withstand high stress.

This objective is achieved by the fact that the interior part of the rim or wheel spider consists of titanium (or a similar highly stressable lightweight material), and the exterior parts of the rim that are connected or can be connected with the interior part of the rim or wheel spider, consist of light metal using aluminum, magnesium and/or plastic.

The invention relies on the general idea of manufacturing only the interior part of the rim or wheel spider, that is particularly important with respect to the stability of the rim, of titanium or a lightweight material of the highest stability that may be hard to process, while the exterior parts of the rim consist of a material that is easier to handle, even when the shape thereof is complicated.

In the case of this construction, the interior part of the rim or wheel spider, that is dimensioned essentially only according to aspects of strength and stability, may be developed to be approximately disk-shaped, or as a part with relatively flat convexities, or of an uncomplicated shape which can be produced from titanium sheet metal at still limited cost, for example, by a deformation in the superplastic condition.

In order to provide the rim with a particularly attractive design, the outside of the interior part of the rim or the wheel spider which faces away from the axle, may completely, or only in a central area, be covered by a cover that preferably consists of the same material as the exterior parts of the rim that form the tire bed. Use of such a material allows for a construction or arrangement that gives the impression this exterior facing material also has a load carrying function, or is in a load carrying connection with the exterior parts of the rim. However, as this material actually has no load carrying function, the cover may have an extremely light weight.

This aesthetic construction allows the interior part of the rim or wheel spider that consists of titanium or the like to be constructed exclusively according to technical load and strength aspects, while at the same time, the visual appearance of the rim can be changed slightly by the changing of the cover.

A particularly high stiffness, with a narrow wall thickness and a correspondingly low weight, can be achieved by means of the fact that the interior part of the rim or wheel spider has a central area that serves for fastening the rim onto a wheel hub or a flange at the hub and that, with respect to the exterior area, is arranged to be axially offset, for example, recessed, in top view of the front side of the rim.

According to one embodiment of the invention, the central area of the rim that is used for the fastening of the wheel at the axle is essentially plane or flat, while radially outside of the central area of the rim, the rim configuration preferably continues as a conical zone that, toward the outside, is followed by a torus.

The torus itself may then continue toward the outside as a preferably approximately planar ring or flat annular zone which, in turn, at the outer circumference of the interior part of the rim or wheel spider, may be bent in the direction of the front side of the rim, particularly to its interior side.

In addition, in the transition area between the torus and the annular zone that connects it toward the outside, openings may be arranged, the edges of which, at least at the areas extending approximately in a radial direction of the rim, are bent out or arched out toward one side of the rim, particularly toward the side of the torus.

As a result of the above-described shape of the interior part of the rim or wheel spider, a high so-called buckling strength is achieved with a narrow wall thickness of the interior part of the rim or wheel spider, which leads to a high ability to withstand stress.

The indicated shaping of the rim is possible by deforming titanium sheets in the superplastic condition, i.e., when the sheet is heated to about 1,000° C. Thus, conventional processes that are known for the working of sheet metal may be used. The titanium sheet metal must only undergo a corresponding additional heating for the deformation In order to achieve a connection of the interior part of the rim or wheel spider with the exterior parts of the rim forming the tire bed, where the interior part is as highly stressable as possible, it may be advantageous to provide the radially exterior part of the rim that is arranged on one front side of the radially interior part of the rim or wheel spider with a front web area that fits onto an outer edge of the interior part of the rim or wheel spider In addition, this exterior part of the rim which carries the tire and/or the exterior part of the rim that carries the tire and is arranged on the other front side of the interior part of the rim or wheel spider may both be provided with an axial annular web portion which rest firmly without play on the outer circumferential edge of the interior part of the rim or wheel spider, for example, on an outer circumferential surface of its bent outer edge.

With this construction, connecting devices, such as screws, that are used for the holding of the exterior wheel carrying parts of the rim to the interior part of the rim or wheel spider are not stressed in a radial direction, i.e., in the direction of particularly high stress to the rim during the driving operation.

Advantageously, suitable components of conventional multipart rims are used as much as possible for the tire bed of the rim according to the invention. This applies particularly to the front parts of the rim that carry the tire and which form the front edges of the tire bed. However, conventional front parts of the rim cannot simply be mounted at an interior part of the rim or wheel spider that consists of titanium because, as a result of the narrow material thickness of the titanium part in comparison to the conventional interior parts of the rim or wheel spiders made of steel, aluminum, or magnesium, a tire bed would be obtained that is too narrow. Therefore the mounting of the front parts of the rim that carry the tire and that form the front edges of the tire bed may take place by means of a ring-disk. This ring-disk has a first axial ring web at its outer circumference, located on the side of the interior part or the rim or wheel spider which extends over the outer edge of the interior part of the rim or wheel spider without or practically without any radial play. This ring-disk also can be provided with a second axial ring web with portions at its inner circumference, facing away from the interior part of the rim or wheel spider that reaches under an interior edge of a ring flange of the respective front part of the rim that holds the tire without or practically without any radial play If ring-disks are arranged on both sides of the interior part of the rim or wheel spider, the first ring webs that face one another at the exterior of the interior part of the rim or wheel spider may be additionally connected with one another in a form-locking way, by means of meshing projections and grooves or the like. These grooves and projections are located on the parts of the webs that face each other. One web can have only grooves with the other only projections, or each web can have both opposing grooves and projections. In each case, the projection on one web would face and mesh with a groove on the other web.

Also, the above-mentioned rings webs can be welded together while the ring-disks are prestressed with respect to one another so that the ring-disks, after the welding-together, rest on the front sides of the interior part of the rim or wheel spider made of titanium or the like with a corresponding tension.

In a way that is known per se, the front parts of the rim may be secured axially by means of studs or the like that are arranged in an annular shape and penetrate the ring flanges of the front parts of the rim, the ring-disks, and the radially exterior area of the interior part or the wheel spider.

These and other objects, features, and advantages of the present invention will become more apparent from the following description when taken in connection with the accompanying drawing which show, for the purposes of illustration only, plural embodiments in accordance with the present invention, and wherein:

DETAILED DESCRIPTION OF THE DRAWINGS

Figure 1:
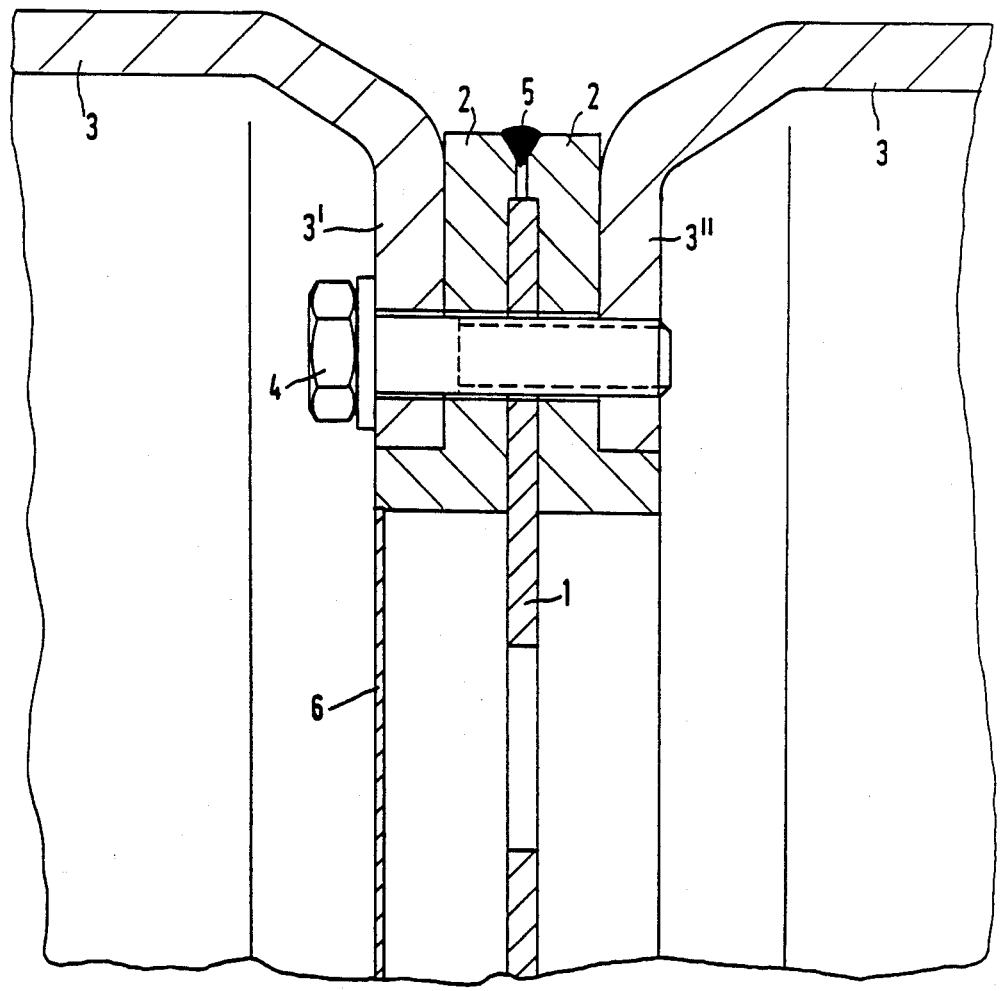
FIG. 1 is a cut-out axial sectional view of a rim according to the invention in the area of the connection between the interior part of the rim or wheel spider and the exterior parts of the rim.

Referring now to the drawings wherein like reference numerals are used to designate like parts and more particularly to FIG. 1, the interior part 1 of the rim or wheel spider is constructed of titanium. Because of the extremely high ability of titanium materials to withstand stress, the interior part 1 of the rim or wheel spider may be constructed to be extremely thin-walled. For example, it can consist of a titanium sheet of a thickness of 1.5 mm. Because of the extremely uncomplicated shape, strength being the critical technical feature, the interior part of the rim or wheel spider 1 may also be produced at low cost, from materials that are difficult to process per se, such as titanium. Essentially, it is only necessary to arrange spider breakthroughs and/or bores in the material of the interior part of the rim or wheel that are used for the ventilating of components, particularly brakes, as well as in the vicinity of the exterior of the rims for fastening purposes.

The exterior parts 3 of the rim may be made of light metals of the aluminum and/or magnesium family, such as is used for the manufacturing of conventional multipart rims from aluminum or magnesium materials. The exterior parts 3 of the rim are located on each side of the interior part of the rim of the wheel spider, and each have ring flanges 3' or 3" for the connection with the interior parts of the rim or the wheel spider. The outward facing front edges (not shown) of the exterior parts 3 of the rim that face away from the flanges 3' or 3" are constructed with a rim flange rim bead or the like which secures a tire in the mounted condition on the rim.

As a result of the narrow wall thickness of the interior part 1 of the rim or wheel spider with respect to conventional interior parts of the rim or wheel spiders made of aluminum or magnesium materials, conventional size exterior parts 3 of tire rims cannot be used by simply mounting them directly at the interior part 1 of the rim or wheel spider. The reason for this is that in this case, the thickness of the interior part 1 of the rim or wheel spider is narrower than conventional wheel spiders and thus the use of conventional exterior rim parts 3 would result in a tire bed that is too narrow for standard tires. In addition, under certain circumstances, the support of the exterior rim parts would not be sufficiently able to withstand stress in radial direction.

To avoid either or both of these problems, the exterior rim parts 3 are connected with the interior of the rim or wheel spider part 1 made of titanium, by means of ring-disk-shaped exterior rim parts 2. These ring-disks 2 consist of a conventional light metal, such as aluminum or magnesium or the like, and in the area of their outer circumference, they have first axial extending web portions that face one another and that reach slightly over the outer circumference of the interior part 1 of the rim or wheel spider, namely without any radial play therebetween. At their radial inner circumference, the ring-disks 2 have second axial ring webs that face away from the interior part 1 of the rim or wheel spider and extend under the inner circumference of the flanges 3' and 3" of the exterior rim parts 3, again without any radial play therebetween.

As a result of using the ring-disk parts 2, the fastening screws 4, which penetrate the flanges 3' and 3" as well as the ring-disks 2 and the radial outer areas of the interior part 1 of the rim or wheel spider are not stressed with respect to a shearing action when the rim or the exterior rim parts 2 and 3 are stressed in radial direction relative to the interior part 1 of the rim or wheel spider 1. The mutual support of parts 1 to 3 therefore takes place by means of firm connection.

The first ring webs, which face one another at the exterior edge of the ring-disks 2, are preferably connected by means of a weld seam 5 that is advantageously made when the ring-disks 2 are prestressed with respect to one another; for example, after the screws 4 are inserted and tightened and parts 1 to 3 are connected with one another. In addition, or as an alternative, mutually meshing recesses and projections, such as ring grooves and ring tongues, may also be arranged at the mentioned first exterior ring webs of the ring-disks 2. In this manner, a recessed groove on one web face would face a corresponding sized tongue projection on the opposing web face such that as the two ring-disks come together, the projections would be snuggly encased by a corresponding groove. One ring-disk could have only grooves and the other only Projections or both can have grooves and projections that face each other. All these measures have the effect that the ring-disks 2 are connected with the interior rim part or wheel spider 1 so that they can withstand high stress.

In the embodiment of FIG. 1, the threaded parts of the screws 4 are screwed into threaded bores of the ring flange 3". Alternatively, it is possible to arrange at both ring flange 3" and ring flange 3', identical bores without any thread and to screw the screws 4 into nuts or the like, arranged at the ring flange 3".

A cover 6 may be arranged inside the opening that is formed by the radially interior ring web of one ring-disk 2 on the side of the interior part 1 of the rim or wheel spider that faces away from the axle (not shown). This cover 6 may be designed exclusively according to aspects of aesthetics. In this case, it is preferable to construct the cover 6 of the same material as the exterior rim parts 2, and particularly part 3, in such a way that an impression is obtained that the wheel consists of only one carrying part. Since the cover 6, in reality, is a component that has no load carrying function, it may have a weight that is practically negligible. As a result of this construction, the design of the rim can be changed any time without major cost.

The shown rim is not limited to the use in motor vehicles as use of the rim for other moving equipment is possible, e.g., for use in landing gears of airplanes.

Another modification of the embodiment shown in FIG. 1, has the ring-disks 2 with their radially exterior axial webs shrunk onto the circumferential edge of the interior part 1 of the rim or wheel spider by heating the ring-disks 2 before their mounting relative to the interior part 1 of the rim or the wheel spider and thus slightly enlarging them as a result of thermal expansion. During the subsequent cooling, the axial webs will then place themselves firmly on the outer circumference of the interior part 1 of the rim or wheel spider. In a corresponding way, the exterior parts 3, with the inner edges of their flanges 3' and 3", may also be shrunk onto the assigned axial webs of the ring-disks 2. In this way, all rim parts are connected with one another without any radial play.

In the embodiment of the rim shown in FIGS. 2 to 5, the interior part 1 of the rim or wheel spider has an arched shape with reversed curves, which results in a high stiffness, as well as a narrow wall thickness. This increases the so-called buckling strength of the rim.

Figure 2:
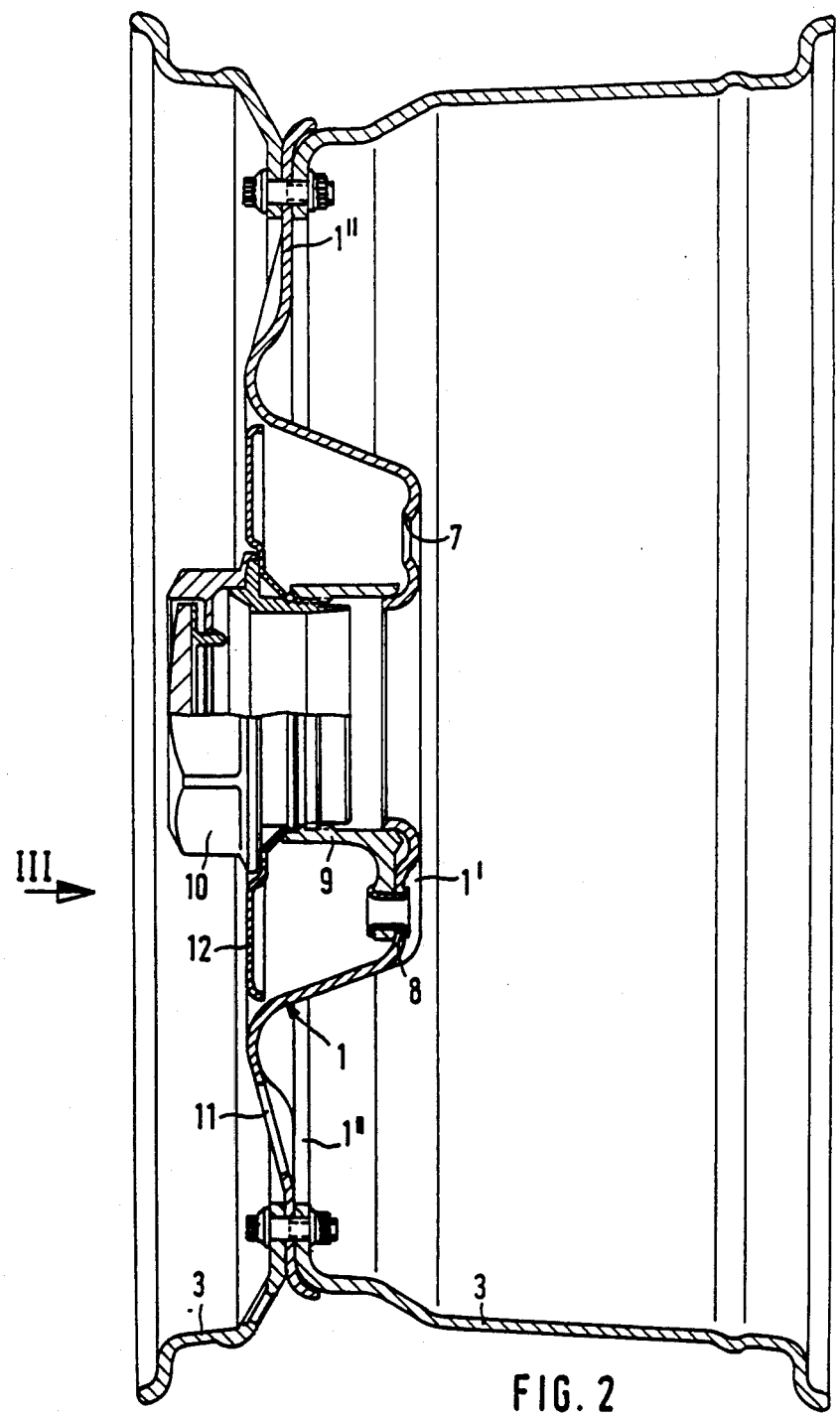
FIG. 2 is an axial sectional view of a complete rim according to a particularly preferred embodiment of the invention corresponding to the section line II—II in FIG. 3.
Figure 3:
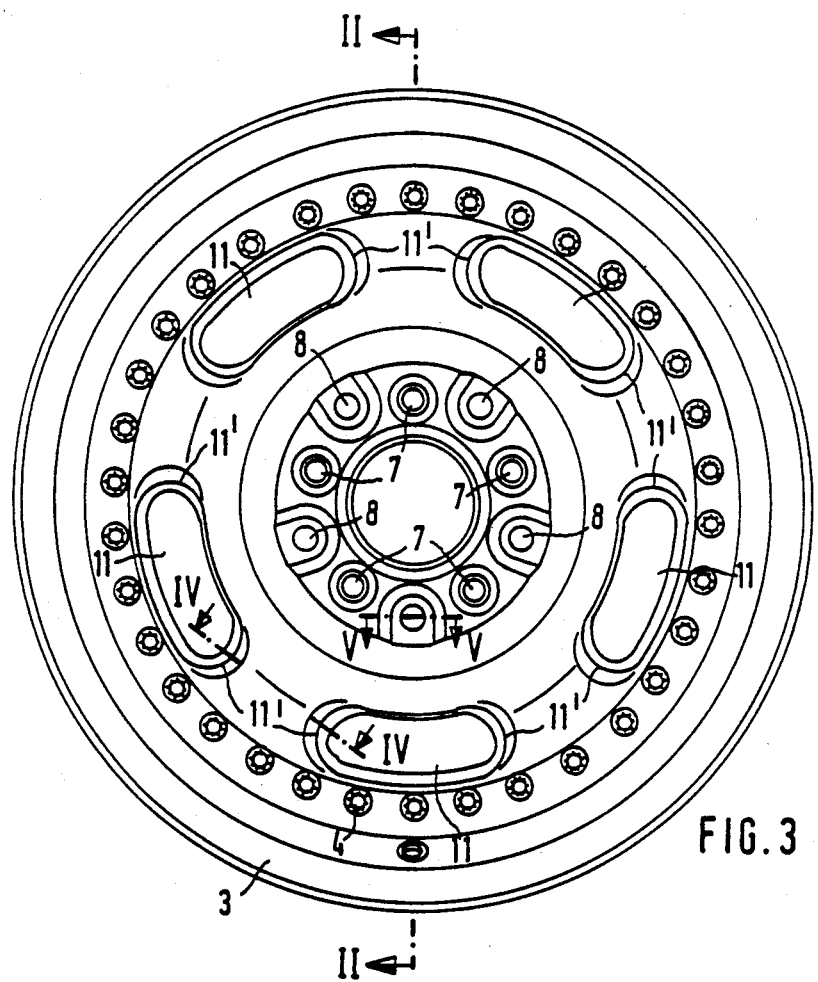
FIG. 3 is a frontal view of the rim shown in FIG. 2 corresponding to the Arrow III in FIG. 2, in which case, however, in the central area of the rim, a cover that can be mounted there and its holding arrangement are left out.
Figure 4:
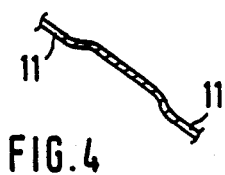
FIG. 4 is a partial sectional view of the rim corresponding to the section line IV—IV in FIG. 3.

A flange-type, essentially plane central part 1' has a central opening that is used for receiving hub parts or the like from the inside of the vehicle (toward the right in FIG. 2), the edge of which central opening is bent in the direction toward the front side of the rim (toward the left in FIG. 2).

The central opening is concentrically surrounded by a row of holes 7 that are used for receiving screws or the like, by means of which the rim can be mounted at a hub on the side of the vehicle, or at a flange that is arranged at this hub. The edges of the holes 7, similar to the central opening, are bent in the direction of the front side of the rim (toward the left in FIG. 2).

Figure 5:
FIG. 5 is a partial sectional view of the rim corresponding to the section line V—V of FIG. 3.

Between holes 7, additional holes 8 are arranged, the surroundings of which each form an enlargement that Projects out of the plane of the central area 1' in the direction of the front side of the rim and has a profile that is shown in FIG. 5. The holes 8 are used for receiving rivets or the like, by means of which, for example, a cylindrical part 9 consisting of aluminum is fastened at molded-on radial fastening flanges on the front side of the rim. The purpose of the cylindrical part 9 is explained further below.

A conical area connects to the central area 1' radially toward the outside and opens up in the direction of the front side of the rim and, at its exterior edge, continues as a torus that is followed by an essentially plane exterior area 1". In this case, the plane of the exterior area 1" is offset in axial direction of the rim relative to the central area 1; i.e., the central area 1', relative to the plane of the exterior area 1", forms an indentation in top view of the front side of the rim.

The outer edge of the exterior area 1" is bent in the direction toward the back of the rim (toward the right in FIG. 2). In the transition area between the torus and the exterior area 1" (see FIG. 3), several oval openings 11 are arranged concentrically with respect to the central opening of the rim. The edges of these openings 11 are bent in the direction of the front side of the rim (toward the left in FIG. 2) at least at the areas 11' that extend approximately radially to the rim center.

Interior parts 1 of the rim or wheel spiders of this embodiment can be manufactured from titanium sheets by a deformation in the superplastic state. The superplastic state is reached by the heating of the titanium sheet to about 1,000° C. Then the titanium sheet can be processed in the conventional way for the purpose of deformation.

At the outer edge of the interior part 1 of the rim or wheel spider, the exterior rim parts 3 forming the tire bed are fastened by means of screws and matching nuts or the like. The exterior rim part 3 on the interior side of the rim (on the right in FIG. 2) has a front side that corresponds to the bent outer edge of the interior part 1 of the rim or wheel spider that, in a form-locking way, is received inside the bent edge of the interior part 1 of the rim or wheel spider 1.

The above-mentioned cylindrical part 9 (FIG. 2) serves for receiving a closing part 10 that may, for example, have the shape of a central nut. The cylindrical part 9 interacts with the closing part 10 for the holding of a cover 12 which, in the embodiment of FIG. 2, covers only the central area 1' of the interior part 1 of the rim or wheel spider as well as the connecting conical area into the proximity of the torus that connects to the conical area. The cover 12 is a part without any load carrying function and may be constructed to be extremely thin-walled and correspondingly light and be designed only according to aesthetic aspects.

Alternatively, the cover 12 may, if desired, cover a larger area of the front side of the interior part 1 of the rim or wheel spider and have its outer circumference extend to the inner circumference of the exterior rim part 3 in the area of the screws 4.

While I have shown and described plural embodiments in accordance with the present invention, it is understood that the same is not limited thereto but is susceptible to numerous changes and modifications as known to one having ordinary skill in the art, and I therefore do not which to be limited to the details shown and described herein, but intend to cover all such modifications as are encompassed by the scope of the appended claims.

I claim:

1. A multipart tire rim having an interior part of a rim for the mounting of the rim at an axle as well as having annular exterior parts that are arranged radially outwardly of the axle on both sides of said interior part of the rim and form a tire bed, wherein:
   said interior part of the rim is made of titanium;
   annular exterior rim parts are provided and connected with the interior part; and
   wherein the exterior rim parts are made of softer light material that is easier to process than said titanium interior part.

2. A rim according to claim 1, wherein said interior part is configured as an essentially flat disk-shaped part.

3. A method for making the rim article according to claim 1, wherein the shape of said interior rim part is manufactured by deformation in the superelastic state.

4. A method for making the rim article according to claim 2, wherein the shape of said interior rim part is manufactured by deformation in the superelastic state.

5. A rim according to claim 1, wherein said interior part has a central area means for fastening said interior part to a wheel hub, said central area means being axially recessed as an offset with respect to an outwardly facing exterior area of said interior part.

6. A rim according to claim 2, wherein said interior part has a central area means for fastening said interior part to a wheel hub, said central area means being axially recessed as an offset with respect to an outwardly facing exterior area of said interior part.

7. A rim according to claim 5, wherein said central area means extends radially outward from the axle and is configured as a conical zone that is followed by a torus zone.

8. A rim according to claim 7, wherein said torus zone continues radially outwardly with an outer portion of said interior part configured as an approximately flat planar ring zone.

9. A rim according to claim 8, wherein in a transition area between the torus and ring zones there are openings with edges some of these edges extend approximately in radial direction of the rim and are angled in the direction of one side of the rim in the direction of the torus zone.

10. A rim according to claim 1, wherein the outer circumference of the interior part is angled toward the interior side of the rim.

11. A rim according to claim 9, wherein the outer circumference of the interior part is angled toward the interior side of the rim.

12. A rim according to claim 10, wherein one of the annular exterior parts has a front side and is angled to congruently fit into the angled outer circumference of the interior part.

13. A rim according to claim 11, wherein one of the annular exterior parts has a front side and is angled to congruently fit into the angled outer circumference of the interior part.

14. A rim according to claim 5, wherein there is a cover means of the same material as the exterior parts of the rim covering an interior radial portion of the interior part.

15. A multipart tire rim having an interior part of a rim for the mounting of the rim at an axle as well as having annular exterior parts that are arranged radially outwardly of the axle on both sides of said interior part of the rim and form a tire bed, wherein:
   said interior part of the rim is made of titanium;
   annular exterior rim parts are provided and connected with the interior part; and
   wherein the exterior rim parts are made of softer light material that is easier to process than said titanium interior part, and further including a ring-disk means radially supported by firm contact with the outer radial edge of the interior part and which have web portions that radially support the annular exterior parts by firm seating contact thereon.

16. A rim according to claim 15, further including two ring-disks, one on each of radially extending sides of the interior part and wherein the web portions on each ring-disk extends axially away from said interior part.

17. A rim according to claim 16, further including securing means that penetrate said outer exterior parts, said ring-disks and said radially exterior area of the interior part to secure these outer exterior parts, ring disks and radially exterior area together.

18. A rim according to claim 15, wherein the ring-disk means have portions that face one another that extend radially outwardly of the interior part and which are physically joined with one another.

19. A multipart tire rim having an interior part of a rim for the mounting of the rim at an axle as well as having annular exterior parts that are arranged radially outwardly of the axle on both sides of said interior part of the rim and form a tire bed, wherein:
   said interior part of the rim is made of titanium;

annular exterior rim parts are provided and connected with the interior part; and wherein the exterior rim parts are made of softer light material that is easier to process than said titanium interior part, said interior part being configured as an essentially flat disk-shaped part, and further including a ring-disk means radially supported by firm contact with the outer radial edge of the interior part and which have web portions that radially support the annular exterior parts by firm seating contact thereon.

20. A rim according to claim 19, further including two ring-disks, one on each of radially extending sides of the interior part and wherein the web portions on each ring-disk extends axially away from said interior parts.

21. A rim according to claim 20, further including securing means that penetrate said outer exterior parts, said ring-disks, and said radially exterior area of the interior part to secure these outer exterior parts, ring disks and radially exterior area together.

22. A rim according to claim 19, wherein the ring-disk means have portions that face one another that extend radially outwardly of the interior part and which are physically joined with one another.

* * * * *